US012706060B2

(12) United States Patent
Han

(10) Patent No.: US 12,706,060 B2
(45) Date of Patent: Aug. 11, 2026

(54) DISPLAY APPARATUS

(71) Applicant: LG Display Co., Ltd., Seoul (KR)

(72) Inventor: Kwanghee Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/745,742

(22) Filed: Jun. 17, 2024

(65) Prior Publication Data

US 2025/0157418 A1 May 15, 2025

(30) Foreign Application Priority Data

Nov. 14, 2023 (KR) ........................ 10-2023-0157225

(51) Int. Cl.
*G09G 3/3291* (2016.01)

(52) U.S. Cl.
CPC ....... *G09G 3/3291* (2013.01); *G09G 2310/08* (2013.01); *G09G 2320/0247* (2013.01); *G09G 2330/04* (2013.01)

(58) Field of Classification Search
CPC ......... G09G 2310/08; G09G 2310/027; G09G 2310/0278; G09G 2310/0243; G09G 2310/0248; G09G 2310/06; G09G 2310/061; G09G 2310/0251; G09G 2310/0264; G09G 2310/0291; G09G 2310/062; G09G 2330/06; G09G 2330/04; G09G 2330/021; G09G 2330/025; G09G 2330/12; G09G 3/3266; G09G 3/36; G09G 3/3611; G09G 3/32; G09G 3/3275; G09G 3/3208; G09G 3/3233; G09G 3/20; G09G 3/2096; G09G 3/3291; G09G 3/3614; G09G 3/3648; G09G 3/3677; G09G 3/006; G09G 3/2092; G09G 3/28; G09G 3/3283; G09G 3/3408; G09G 3/2018; G09G 3/2022; G09G 3/2059; G09G 3/2074; G09G 3/22; G09G 3/2803; G09G 3/288; G09G 3/296; G09G 3/3225; G09G 3/3413; G09G 3/342; G09G 3/3685; G09G 3/3696; G09G 5/12; G09G 5/00; G09G 5/008; G09G 5/003;

(Continued)

(56) References Cited

U.S. PATENT DOCUMENTS 10,056,024 B2 8/2018 Kim et al.
2005/0264696 A1 * 12/2005 Ozawa .................. G09G 5/008
348/E9.029

(Continued)

FOREIGN PATENT DOCUMENTS

KR 102316983 B1 10/2021

*Primary Examiner* — Dong Hui Liang
(74) *Attorney, Agent, or Firm* — Seed Intellectual Property Law Group LLP

(57) ABSTRACT

A display apparatus may include a display panel including a plurality of pixels, and a controller configured to control an operation of the display panel. The controller may be configured to generate an internal synchronization signal including one or more of an internal horizontal synchronization signal and an internal vertical synchronization signal, based on an external synchronization signal input thereto, the external synchronization signal having a frequency that increases by a multiple, and generate a scan pulse signal to scan the display panel, based on one or more of the generated internal horizontal synchronization signal and the generated internal vertical synchronization signal.

19 Claims, 6 Drawing Sheets

(58) Field of Classification Search
CPC ............ G09G 5/18; G09G 5/005; G09G 5/28; G09G 5/32; G09G 5/397; G09G 5/001; G09G 5/14; G09G 5/395; G09G 2320/0276; G09G 2320/103; G09G 2320/0247; G09G 2320/0295; G09G 2320/0626; G09G 2320/0219; G09G 2320/0233; G09G 2320/0209; G09G 2320/0223; G09G 2320/043; G09G 2320/0257; G09G 2320/04; G09G 2320/062; G09G 2320/064; G09G 2320/0673; G09G 2320/0686; G09G 2360/16; G09G 2360/08; G09G 2360/12; G09G 2360/127; G09G 2370/04; G09G 2370/08; G09G 2370/00; G09G 2370/022; G09G 2370/12; G09G 2370/20; G09G 2300/0426; G09G 2300/0857; G09G 2300/0452; G09G 2300/0413; G09G 2300/0809; G09G 2300/0819; G09G 2300/0842; G09G 2300/0861; G09G 2340/16; G09G 2340/125; G09G 2340/0435; G09G 2340/045; G09G 2340/02; G09G 2340/10; G09G 2380/10
See application file for complete search history.

(56) References Cited

U.S. PATENT DOCUMENTS

| | | | | |
|---|---|---|---|---|
| 2007/0146281 A1* | 6/2007 | Hosihara | G09G 3/3614 345/96 |
| 2017/0162236 A1* | 6/2017 | Morimoto | G11C 7/1045 |
| 2021/0149540 A1* | 5/2021 | Shikata | G06F 3/04184 |

* cited by examiner

DISPLAY APPARATUS

CROSS-REFERENCE TO RELATED APPLICATION

This application claims priority to Korean Patent Application No. 10-2023-0157225 filed on Nov. 14, 2023, in the Korean Intellectual Property Office, the entire contents of which is hereby expressly incorporated by reference into the present application.

BACKGROUND

Technical Field

The present disclosure relates to a display apparatus.

Description of the Related Art

Representative examples of display apparatuses include liquid crystal display apparatuses (LCD), field emission display apparatuses (FED), electro luminescence display apparatuses (ELD), electro-wetting display apparatuses (EWD), and organic light emitting display apparatuses (OLED).

Among these display apparatuses, the organic light-emitting display apparatuses display an image through a pixel including an organic light-emitting element as a self-light-emitting element. Therefore, compared to other display apparatuses, the organic light emitting display apparatus has the advantage of having a smaller thickness, a wider viewing angle, and a faster response speed.

Regarding data transmission in these display apparatuses, an external system applies data and an external synchronization signal to a data driver to generate an internal synchronization signal. When the internal synchronization signal is generated based on the received external synchronization signal, timings of all signals generated based on the generated internal synchronization signal are deviated due to jitter.

Furthermore, among the generated signals, a pulse signal affects the image, ultimately causing image defects due to noise.

BRIEF SUMMARY

Image defects occur as jitters in all signals accumulate due to jitter generated in a synchronization signal. Accordingly, the inventors of the present disclosure have invented a display apparatus that prevents the jitter from occurring in signals generated based on the horizontal synchronization signal.

The disclosure is related to a display apparatus that generates a horizontal synchronization signal and generates a scan pulse signal to drive a display panel based on the horizontal synchronization signal. Embodiments of the present disclosure are to provide a display apparatus that adjusts a timing on an oscillator clock period basis based on an internal synchronization signal.

The disclosure resolves, among others, the image defects caused by jitter accumulation by setting a timing based on the horizontal synchronization signal.

Furthermore, embodiments of the present disclosure provide a display apparatus that increases a frequency of an external synchronization signal input from an external system by a predetermined multiple and generates a horizontal synchronization signal based on the external synchronization signal having the frequency increased by the predetermined multiple.

Embodiments of the present disclosure provide a display apparatus that generates a scan signal that scans a display panel based on a horizontal synchronization signal having the frequency increased by the predetermined multiple, thereby reducing the jitter.

Embodiments of the present disclosure provide a display apparatus including a controller including a timing controller that generates the scan pulse configured to drive the display panel based on an internal synchronization signal generated based on an external synchronization signal, and to a data driver configured to convert image data into data voltages and supply the data voltages to the display panel.

A display apparatus according to an embodiment of the present disclosure is provided that generate a horizontal synchronization signal and generate a scan pulse configure to operate a display panel based on the horizontal synchronization signal.

Furthermore, a display apparatus according to an embodiment of the present disclosure is provided that includes a controller that generates an internal synchronization signal including an internal horizontal synchronization signal and an internal vertical synchronization signal based on an external synchronization signal input thereto, the external synchronization signal having a frequency increased by a predetermined multiple.

Furthermore, a display apparatus according to an embodiment of the present disclosure is provided that includes a controller that generates a scan pulse configured to scan a display panel, based on an internal horizontal synchronization signal.

Furthermore, a display apparatus according to an embodiment of the present disclosure is provided that includes a controller including a timing controller that generates an internal horizontal synchronization signal based on an external synchronization signal input thereto, the external synchronization signal having a frequency that increases by a multiple, and generates a scan pulse signal configured to drive the display panel based on the internal synchronization signal, and to a data driver configured to convert an image data into data voltages and supply the data voltages to the display panel. The timing controller and the data driver are integrated with each other.

A display apparatus according to an embodiment of the present disclosure may include a display panel including a plurality of pixels, and a controller configured to control an operation of the display panel. The controller may be configured to generate an internal synchronization signal including one or more of an internal horizontal synchronization signal and an internal vertical synchronization signal, based on an external synchronization signal input thereto, the external synchronization signal having a frequency that increases by a multiple, and generate a scan pulse signal to scan the display panel, based on one or more of the generated internal horizontal synchronization signal and the generated internal vertical synchronization signal.

A display apparatus according to an embodiment of the present disclosure may include a display panel including a plurality of pixels, and a controller configured to control an operation of the display panel. The controller may be configured to generate an internal synchronization signal based on an input synchronization signal, the input synchronization signal including a plurality of first clocks, the internal synchronization signal including a plurality of second clocks, each second clock corresponding to a first clock in that a starting time point of a first edge of the second clock corresponds to a starting point of a first edge of the corresponding first clock, and at least one first clock not corresponding to any second clock and precedent to any first clock that corresponds to a second clock.

According to an embodiment of the present disclosure, the timing controller that generates the scan pulse and the data driver that provides the data voltage to the display panel are integrated with each other, thereby providing a display apparatus optimized for a mobile apparatus.

Furthermore, according to an embodiment of the present disclosure, the horizontal synchronization signal is generated using the synchronization signal having the frequency increased by the predetermined multiple, and the scan pulse that scans the display panel is generated based on the generated horizontal synchronization signal, thereby minimizing jitter accumulation.

Furthermore, according to an embodiment of the present disclosure, the frequency of the synchronization signal may be increased by two times, and the horizontal synchronization signal may be generated based on the synchronization signal having the increased frequency, thereby reducing the jitter accumulated in the scan pulse.

Furthermore, according to an embodiment of the present disclosure, the frequency of the synchronization signal may be increased by fourth times, and the horizontal synchronization signal may be generated based on the synchronization signal having the increased frequency, thereby reducing the jitter accumulated in the scan pulse.

BRIEF DESCRIPTION OF THE SEVERAL VIEWS OF THE DRAWINGS

The accompanying drawings, which are included to provide a further understanding of the disclosure, are incorporated in and constitute a part of the disclosure, illustrate aspects of the disclosure and together with the description serve to explain principles of the disclosure.

DETAILED DESCRIPTION

Figure 1:
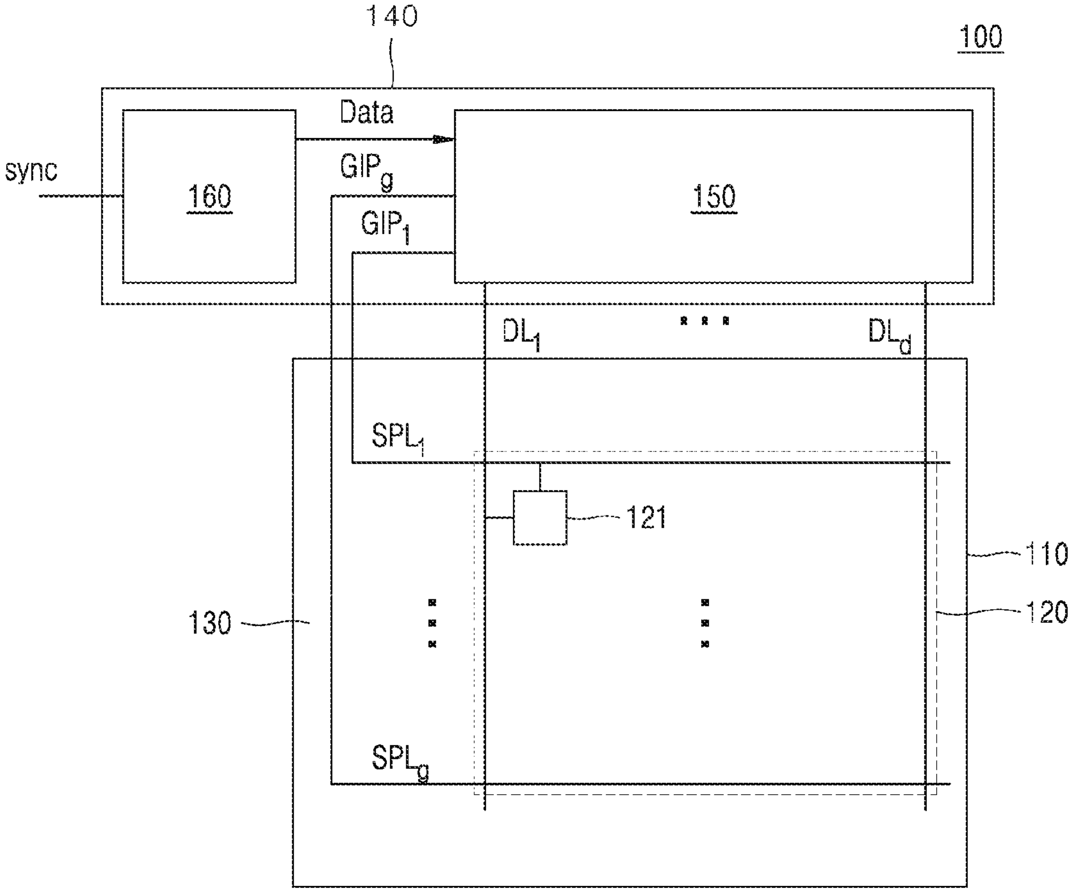
FIG. 1 illustrates a configuration of a display apparatus according to an embodiment of the present disclosure.

Reference is now made in detail to aspects of the present disclosure, examples of which may be illustrated in the accompanying drawings. In the following description, when a detailed description of well-known methods, functions, structures or configurations may unnecessarily obscure aspects of the present disclosure, a detailed description of such known functions or configurations may be omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Technical characteristics and features of the present disclosure, and implementation methods thereof, are clarified through embodiments described with reference to the accompanying drawings. However, the present disclosure may be embodied in various different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, areas, portions, steps, operations, and/or the like), one or more other elements may be added unless a term, such as "only" or the like is used. The terms used in the present disclosure are merely used in order to describe particular example aspects, and are not intended to limit the scope of the present disclosure. The terms of a singular form may include plural forms unless the context clearly indicates otherwise.

The word "exemplary" is used to mean serving as an example or illustration, unless otherwise specified. Embodiments are example embodiments. Aspects are example aspects. In one or more implementations, "embodiments," "aspects," "examples," and the like should not be construed to be preferred or advantageous over other implementations. An aspect, an example, an example aspect, or the like may refer to one or more aspects, one or more examples, one or more example aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless "a more limiting term, such as "just," "immediate (ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

When a certain embodiment may be embodied differently, a function or an operation specified in a specific block may occur in a different order from an order specified in a flowchart. For example, two blocks in succession may be actually performed substantially concurrently, or the two blocks may be performed in a reverse order depending on a function or operation involved.

It is understood that, although the terms "first," "second," or the like may be used herein to describe various elements (e.g., layers, films, components, sections, members, parts, regions, areas, portions, steps, operations, and/or the like), these elements should not be limited by these terms, for example, to any particular order, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," or "(b)," or the like may be used. These terms are intended to identify the corresponding element(s) from the other element(s), and these terms are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with the another element, but also indirectly overlap, or the like with another element with one or more intervening elements disposed or interposed between the elements, unless otherwise specified.

The phrase that an element (e.g., layer, film, region, component, section, or the like) is "provided," "disposed," "connected," "coupled," or the like in, on, with or to another element may be understood, for example, as that at least a portion of the element is provided, disposed, connected, coupled, or the like in another element, or that the entirety of the element is provided, disposed, connected, coupled, or the like in another element. The phrase that an element (e.g., layer, film, region, component, section, or the like) "contacts," "overlaps," or the like with another element may be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms may mean a wider range of lines or directions within which the components of the present disclosure can operate functionally. For example, the terms "first direction," "second direction," and the like, such as a direction parallel or perpendicular to "x-axis," "y-axis," or "2-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item," may represent (i) a combination of items provided by one or more of the first item, the second item, and the third item and (ii) only one of the first item, the second item, and the third item.

The expression of a first element, a second elements, "and/or" a third element should be understood to encompass one of the first, second, or third elements, one of the first, second, and third elements, as well as any and all combinations of the first, second and third elements. By way of example, A, B and/or C encompass only A; only B; only C; any of A, B, and C (e.g., A, B, or C); some combinations of A, B, and C (e.g., A and B; A and C; or B and C); and all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, or and may be operated, linked, or driven together in various ways. Aspects of the present disclosure may be implemented or carried out independently from each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning, for example, consistent with their meaning in the context of the relevant art and should not be interpreted in an idealized or overly formal sense, unless expressly defined otherwise herein.

The terms used herein have been selected as being general in the related technical field. However, there may be other terms than the terms depending on the development and/or change of technology, convention, preference of technicians, etc. Therefore, the terms used herein should not be understood as limiting technical ideas, but should be understood as examples of the terms for illustrating embodiments.

Further, in a specific case, a term may be arbitrarily selected by the applicant, and in this case, the detailed meaning thereof is described herein. Therefore, the terms used herein should be understood based on not only simply the name of the terms, but also the meaning of the terms and the contents thereof.

"X-axis direction," "Y-axis direction" and "Z-axis direction" should not be construed by a geometric relation only of a mutual vertical relation and may have broader directionality within the range that elements of the present disclosure may act functionally.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, a display apparatus according to each of embodiments of the present disclosure will be described with reference to the attached drawings.

Figure 2:
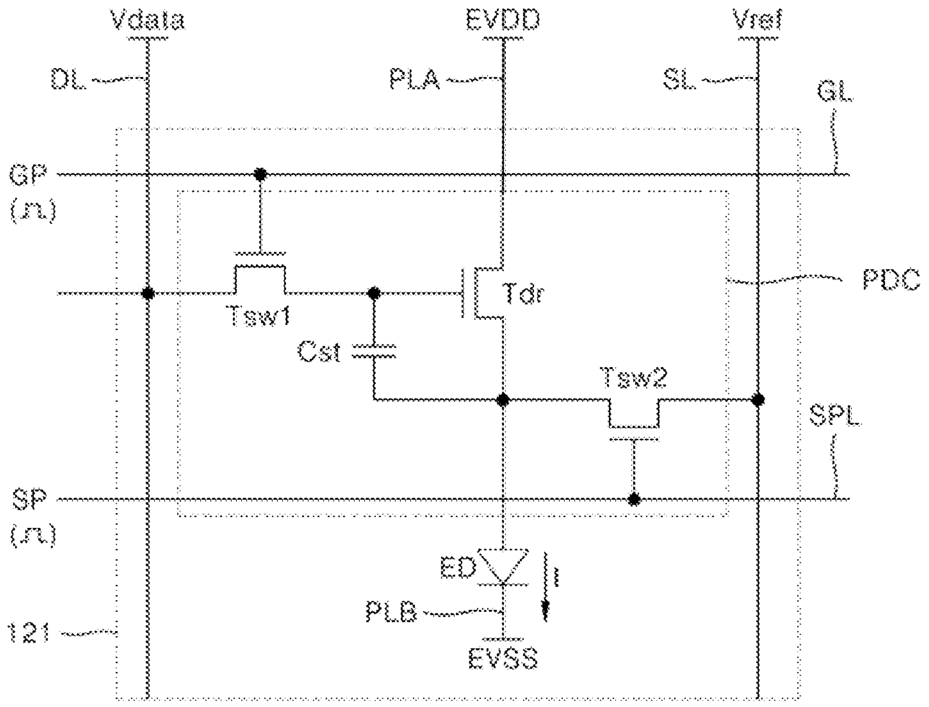
FIG. 2 illustrates a configuration of a pixel applied to a display apparatus according to an embodiment of the present disclosure.

FIG. 1 illustrates a configuration of a display apparatus according to an embodiment of the present disclosure. FIG. 2 illustrates a configuration of a pixel applied to a display apparatus according to an embodiment of the present disclosure.

The display apparatus according to an embodiment of the present disclosure may be a liquid crystal display apparatus, an organic light-emitting display apparatus using an organic light-emitting diode, or a light-emitting display apparatus using another type of a light-emitting element. In other words, embodiments of the present disclosure may also be applied to the liquid crystal display apparatus that uses liquid crystals rather than the light-emitting element, and the light-emitting display apparatus that uses an inorganic light-emitting element. Furthermore, the display apparatus according to an embodiment of the present disclosure may be mounted on a portable apparatus.

However, hereinafter, for convenience of description, an example in which the display apparatus is embodied as a light-emitting display device using a light-emitting element is described.

As shown in FIG. 1 and FIG. 2, an area of a display apparatus 100 according to an embodiment of the present disclosure may be divided into or include a display area 120 and a non-display area 130 surrounding the display area 120. Further, the display area 120 may include a pixel 121 including a light-emitting element ED and a pixel driver circuit PDC, and the non-display area 130 may have a gate driver built in the non-display area 130 that supplies a gate signal to the PDC.

According to an embodiment of the present disclosure, the display apparatus 100 may include a display panel 110 including the pixels 121, and a controller 140.

For example, the controller 140 may include a timing controller 160 that supplies an image data Data and an external synchronization signal to a data driver 150, and the data driver 150 that converts the image data Data transmitted from the timing controller 160 to a data voltage Vdata, and outputs the converted data voltages Vdata to data lines DLI to DLd provided in the display panel 110.

For example, the timing controller 160 and the data driver 150 may be configured as separate components in the display apparatus 100 or may be built into a single chip (e.g., the controller 140).

For example, the timing controller 160 may generate an internal synchronization signal including an internal horizontal synchronization signal and an internal vertical synchronization signal based on an external synchronization signal input with a frequency having been increased by a predetermined multiple.

Furthermore, the timing controller 160 may generate a scan pulse to scan the display panel 110 based on the generated internal horizontal synchronization signal and/or the generated internal vertical synchronization signal.

Also, the display panel 110 is provided with a plurality of scan pulse lines SPL1 to SPLg through which scan pulses generated by the timing controller 160 are transmitted.

Furthermore, the display apparatus 100 may include a power supply that supplies power to the display panel 110 and the controller 140 (e.g., the timing controller 160 and the data driver 150).

Hereinafter, the above components are described sequentially.

According to an embodiment of the present disclosure, the display panel 110 according to an embodiment of the present disclosure may include the display area 120 equipped with the pixels 121 including the light-emitting elements ED and the pixel driver circuits PDC, and the non-display area 130 surrounding the display area 120.

For example, the gate driver that supplies the gate signals to the pixel driver circuits PDC may be embedded in the non-display area 130.

As shown in FIG. 2, the display panel 110 may be provided with the pixel 121 including the light-emitting element ED and the pixel driver circuit PDC. Furthermore, signal lines are formed in the display panel 110 so as to define a pixel area where the pixels 121 are disposed and to supply driving signals to the pixel driver circuit PDC.

According to an embodiment of the present disclosure, the light-emitting element ED may include a first electrode, a light-emitting layer disposed on the first electrode, and a second electrode disposed on the light-emitting layer. For example, the light-emitting layer may include one of a blue light-emitting part, a green light-emitting part, and a red light-emitting part to respective emit light beams of colors corresponding to the colors in the pixel 121. Furthermore, the light-emitting layer may include one of an organic light-emitting layer, an inorganic light-emitting layer, and a quantum dot light-emitting layer, or may include a stacked or mixed structure of the organic light-emitting layer (or the inorganic light-emitting layer) and the quantum dot light-emitting layer.

According to an embodiment of the present disclosure, the signal lines may include a gate line GL, a scan pulse line SPL, a data line DL, a sensing line SL, a first driving power line PLA, and a second driving power line PLB.

For example, the gate lines may be arranged in parallel and may be spaced apart from each other by an equal distance along a second direction of the display panel 110, for example, in a column direction and may extend in a first direction of the display panel, for example, in a row direction.

For example, the scan pulse lines SPL may be arranged in parallel and may be spaced apart from each other by an equal distance along the second direction of the display panel 110, for example, in the column direction and may extend in the first direction of the display panel, for example, in the row direction. The scan pulse lines SPL may be parallel to the gate lines. The scan pulse SP generated by the controller 140 is supplied to the scan pulse lines SPL.

For example, the data lines DL may be arranged in parallel and may be spaced apart from each other by an equal distance along the first direction of the display panel 110, for example, in the row direction and may extend in the second direction of the display panel, for example, in the column direction, and may intersect the gate lines and the scan pulse lines SPL.

Furthermore, the arrangement structure of the data lines DL and the gate lines may vary in various ways.

For example, the sensing lines SL may be arranged in parallel and may be spaced apart from each other by an equal distance along the first direction of the display panel 110, for example, in the row direction and may extend in the second direction of the display panel, for example, in the column direction, and may be parallel to the data lines DL. However, embodiment of the present disclosure is not limited thereto. For example, at least three pixels 121 may constitute one unit pixel, and in this case, one sensing line SL may be formed in the unit pixel.

According to an embodiment of the present disclosure, the first driving power lines PLA may be arranged in parallel and may be spaced apart from each other by an equal distance along the first direction of the display panel 110, for example, in the row direction and may extend in the second direction of the display panel, for example, in the column direction, and may be parallel to the data lines DL and the sensing lines SL. The first driving power line PLA may be connected to the power supply and may supply a first driving power EVDD supplied from the power supply to each pixel 121.

According to an embodiment of the present disclosure, the second driving power lines PLB may supply a second driving power EVSS supplied from the power supply to each pixel 121.

According to an embodiment of the present disclosure, the pixel driver circuit PDC may include a driving transistor Tdr that controls a current I flowing through the light-emitting element ED, a switching transistor Tsw1 connected between the data line DL, and the driving transistor Tdr and the gate line, a sensing transistor Tsw2 connected to the light-emitting element ED and the sensing line SL, and a capacitor Cst. Furthermore, the pixel driver circuit PDC provided in each of the pixels 121 may further include transistors for external compensation or internal compensation.

For example, the pixel driver circuit PDC may be modified into various structures to perform internal compensation or external compensation. A scheme of driving the pixel driver circuit PDC may vary in various ways.

The external compensation may include calculating an amount of change in a threshold voltage or mobility of the driving transistor Tdr formed in the pixel 121 and varying a magnitude of the data voltages Vdata supplied to the pixel based on the amount of the change. Accordingly, the structure of the pixel 121 may be modified into various forms so that the amount of the change in the threshold voltage or mobility of the driving transistor Tdr may be calculated.

The internal compensation may be performed that the current transmitted to the light-emitting element of the driving transistor Tdr formed in the pixel 121 is not affected by the threshold voltage of the driving transistor Tdr. To this end, the structure and driving scheme of the pixel may be modified into various forms so that the threshold voltage may be removed from a formula for calculating the current.

The display area 120 of the display panel 110 refers to an area where images are output by the pixels 121, and the non-display area 130 refers to an area where the images are not displayed. The non-display area 130 may be disposed outside the display area 120.

According to an embodiment of the present disclosure, the gate driver may supply the gate signals to the pixel driver circuits PDC.

The gate driver may be provided in the non-display area 130 and may be manufactured in a same process as a process in which the pixel driver circuits PDC are manufactured.

For example, the gate driver may be directly built into the display panel 110 by a gate in panel (GIP) manner.

The gate driver may include stages connected to the gate lines disposed in the display panel 110.

In each of the stages, a first terminal may be connected to an n-th gate clock line to which an n-th gate clock is supplied. A second terminal may be connected to a gate-on transistor connected to the gate line, and the first terminal may be connected to a gate of the gate-on transistor. The second terminal may include a ripple compensation capacitor connected to a reverse-phase gate clock line to which another gate clock is supplied.

The gate driver may supply a gate on signal GP to the gate lines disposed in the display panel 110 by gate control signals GCS transmitted from the timing controller 160. The gate control signals GCS may include a plurality of gate clocks.

In this regard, the gate on signal GP may mean a signal that may turn on the switching transistor Tsw1 connected to the gate lines. A signal that may turn off the switching transistor Tsw1 is referred to as a gate-off signal. The gate on signal GP and the gate off signal are collectively referred to as the gate signal.

The gate driver may generate the gate signal for data addressing in response to the gate control signal GCS supplied from the timing controller 160 and sequentially supply the generated gate signal to m gate lines. Furthermore, the gate driver may include a shift register that sequentially outputs the gate signal based on the gate control signal GCS.

According to an embodiment of the present disclosure, the non-display area 130 may include gate clock lines configured to supply the gate clocks to the gate driver.

According to an embodiment of the present disclosure, the power supply may supply the power to the display panel 110, the gate driver, the data driver 150, and the timing controller 160.

According to an embodiment of the present disclosure, the data driver 150 converts the image data Data transmitted from the timing controller 160 into the data voltages Vdata, and then supplies the data voltages Vdata to the data lines DLI to DLd.

The data driver 150 receives the data control signal DCS and modulated input image data supplied from the timing controller 160. In addition, the data driver 150 samples the modulated input image data input on a first horizontal line basis based on the data control signal DCS, and converts the sampled data into the data voltage Vdata in an analog form based on a plurality of reference gamma voltages, and supplies the data voltage Vdata to the data line DL of each pixel P.

According to an embodiment of the present disclosure, the timing controller 160 may generate an internal synchronization signal including an internal horizontal synchronization signal and an internal vertical synchronization signal by a synchronization signal (e.g., an external synchronization signal) input from the external system. Furthermore, the timing controller 160 may generate a scan pulse (e.g., a GIP signal GIP1 to GIPg) that scans the display panel 110 based on the internal horizontal synchronization signal or the generated internal vertical synchronization signal.

According to an embodiment of the present disclosure, the timing controller 160 may generate the gate control signal GCS configured to control the driving of the gate driver and the data control signal DCS configured to control ng the driving of the data driver, based on the synchronization signal sync input from the external system. In this case, the gate driver may be included in the display device 100.

Furthermore, the timing controller 160 may convert input image data Ri, Gi, and Bi input from the external system into the image data Data and transmits the image data Data to the data driver 150.

To this end, the timing controller 160 may rearrange the input image data Ri, Gi, and Bi transmitted from the external system by the synchronization signal transmitted from the external system, and may transmit the rearranged image data to the data driver 150.

The gate control signal GCS may include the gate clocks to generate the gate signals.

The timing controller 160 may generate compensation values for external compensation by sensing data received from the pixel driver circuits PDC through the data driver 150.

Furthermore, the timing controller 160 may generate various control signals and transmit the various control signals to the gate driver and the data driver 150 so that an operation for the internal compensation may be performed.

According to an embodiment of the present disclosure, the timing controller 160 may increase a frequency of the synchronization signal (e.g., the external synchronization signal) transmitted from the external system by a predetermined multiple.

According to an embodiment of the present disclosure, the timing controller 160 (or the external system) may generate an internal synchronization signal including an internal horizontal synchronization signal (hsync) and an internal vertical synchronization signal (vsync), based on the synchronization signal (Xsync) (e.g., external synchronization signal) having a frequency increased by a predetermined multiple (e.g., 2 times, 3 times, 4 times, etc.) as received from the timing controller 160 (or the external system). Then, the timing controller 160 may generate the scan pulse (e.g., a GIP signal) which scans the display panel 110, based on the generated internal horizontal synchronization signal or the generated internal vertical synchronization signal.

According to an embodiment of the present disclosure, the timing controller 160 may generate the internal synchronization signal (e.g., internal horizontal synchronization signal and/or internal vertical synchronization signal) having a frequency increased by the predetermined multiple, based on the synchronization signal (Xsync) (e.g., external synchronization signal) having the frequency increased by the predetermined multiple (e.g., 2 times, 3 times, 4 times, etc.) as received from the timing controller 160 (or the external system).

According to an embodiment of the present disclosure, the timing controller 160 may generate the internal horizontal synchronization signal whose voltage changes from a low level to a high level at a point (or a time point) at which a voltage of the internal synchronization signal rises from a low level to a high level.

According to an embodiment of the present disclosure, when the synchronization signal with the frequency increased by two times is input from the external system to the timing controller 160, the timing controller 160 may generate the internal horizontal synchronization signal so that after a voltage of the first clock of the input synchronization signal falls from a high voltage to a low voltage, a point (or a time point) at which the voltage of the second clock of the input synchronization signal rises from a low voltage to a high voltage and a point (or a time point) at which a voltage of the first clock of the internal horizontal synchronization signal rises from low voltage to high voltage coincide or correspond with each other.

According to an embodiment of the present disclosure, the timing controller 160 may generate the internal horizontal synchronization signal so that after a voltage of the second clock of the input synchronization signal falls from a high voltage to a low voltage, a point (or a time point) at which the voltage of the third clock of the input synchronization signal rises from a low voltage to a high voltage and a point (or a time point) at which a voltage of the second clock of the internal horizontal synchronization signal rises from low voltage to high voltage coincide or correspond with each other.

According to an embodiment of the present disclosure, the timing controller 160 may generate the scan pulse as follows: when the voltage of the first clock of the internal horizontal synchronization signal falls from a high voltage to a low voltage, the scan pulse transmitted to the first scan pulse line SPL1 falls from a high voltage to a low voltage; and when the voltage of the second clock of the internal horizontal synchronization signal falls from a high voltage to a low voltage, the scan pulse that has fallen to the low voltage rises to a high voltage.

For example, the generated scan pulse may be generated based on a point (or a time point) at which a voltage of the first clock of the internal horizontal synchronization signal falls and a point (or a time point) at which a voltage of the second clock of the internal horizontal synchronization signal falls.

According to an embodiment of the present disclosure, when the synchronization signal with the frequency increased by four times is input from the external system to the timing controller 160, the timing controller 160 may generate the internal horizontal synchronization signal so that after a voltage of the second clock of the internal synchronization signal falls from a high voltage to a low voltage, a point (or a time point) at which the voltage of the third clock of the input synchronization signal rises from a low voltage to a high voltage and a point (or a time point) at which a voltage of the first clock of the internal horizontal synchronization signal rises from low voltage to high voltage coincide or correspond with each other.

According to an embodiment of the present disclosure, the timing controller 160 may generate the internal horizontal synchronization signal so that after a voltage of the third clock of the input synchronization signal falls from a high voltage to a low voltage, a point (or a time point) at which the voltage of the fourth clock of the input synchronization signal rises from a low voltage to a high voltage and a point (or a time point) at which a voltage of the second clock of the internal horizontal synchronization signal rises from low voltage to high voltage coincide or correspond with each other.

According to an embodiment of the present disclosure, the timing controller 160 may generate the scan pulse as follows: when the voltage of the first clock of the internal horizontal synchronization signal falls from a high voltage to a low voltage, the scan pulse transmitted to the first scan pulse line SPL1 falls from a high voltage to a low voltage; and when the voltage of the fourth clock of the internal horizontal synchronization signal falls from a high voltage to a low voltage, the scan pulse that has fallen to the low voltage rises to a high voltage.

For example, the generated scan pulse may be generated based on the point (or the time point) at which a voltage of the first clock of the internal horizontal synchronization signal falls and the point (or the time point) at which a voltage of the fourth clock of the internal horizontal synchronization signal falls.

Therefore, the timing controller 160 may adjust the timing on an oscillator clock period basis, based on the generated internal horizontal synchronization signal (or internal vertical synchronization signal).

Then, the timing controller 160 may generate the scan pulse configured drive the display panel 110 based on the generated internal horizontal synchronization signal or the generated internal vertical synchronization signal, and then may output the generated scan pulse to the scan pulse lines provided in the display panel 110.

Figure 3:
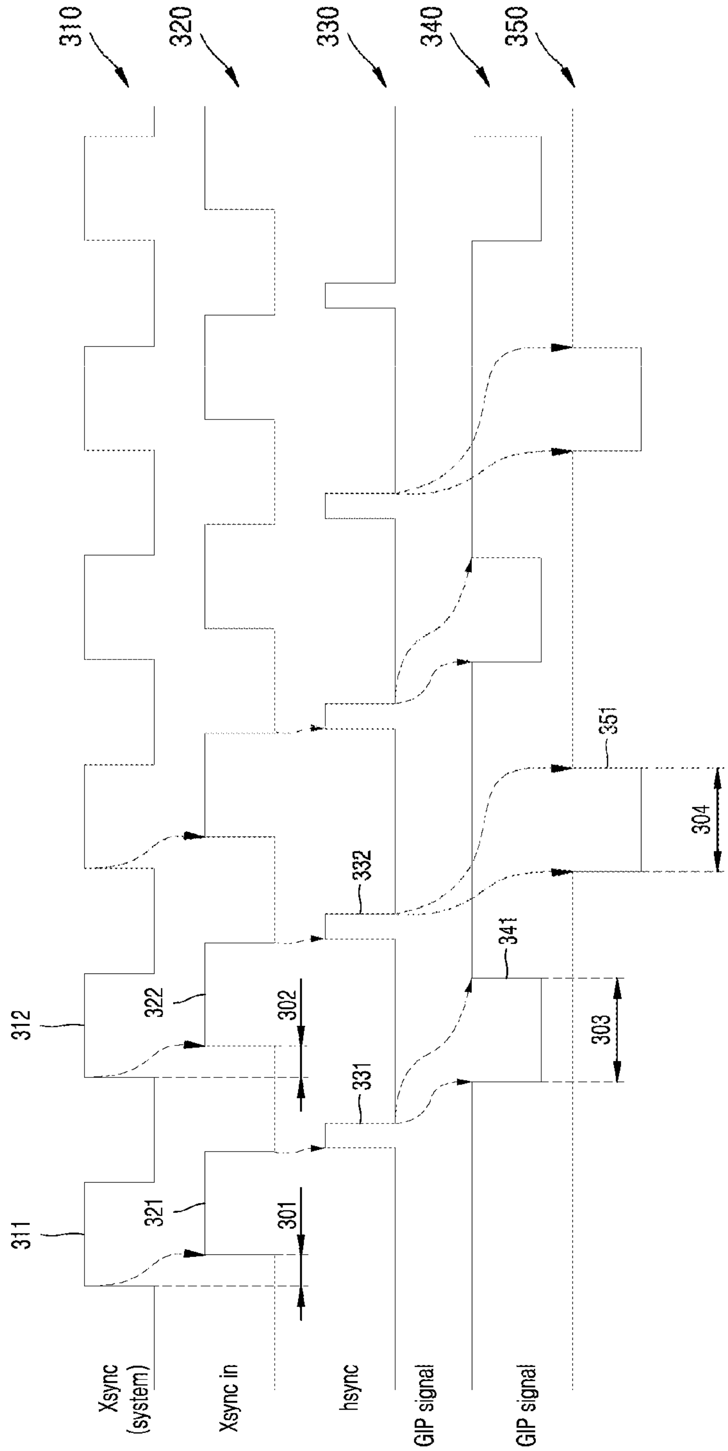
FIG. 3 is an example in which a timing controller according to an embodiment of the present disclosure generates an internal synchronization signal based on an external synchronization signal and generates a scan pulse to scan a display panel based on the internal synchronization signal.
Figure 4:
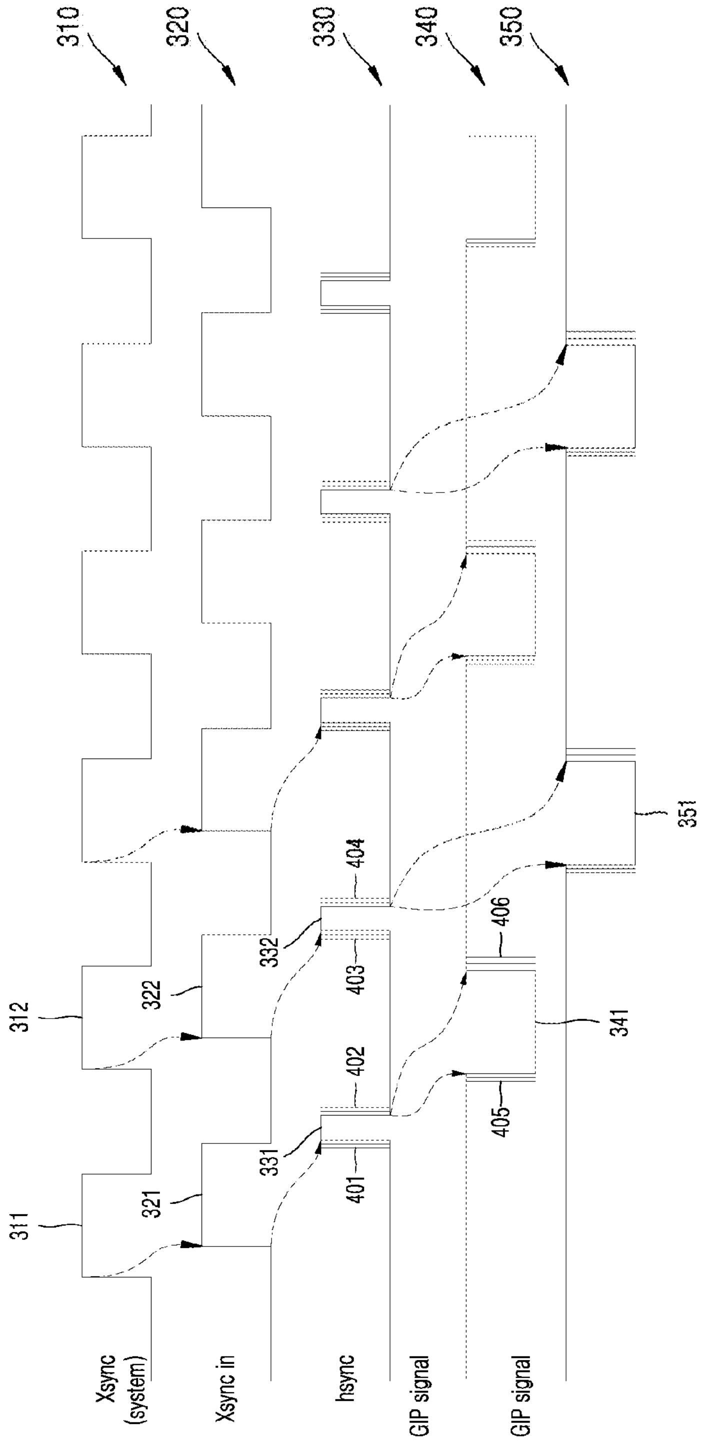
FIG. 4 is an example showing a state in which jitter occurs in an internal synchronization signal generated by a timing controller according to an embodiment of the present disclosure.

FIG. 3 is an example in which a timing controller according to an embodiment of the present disclosure generates an internal synchronization signal based on an external synchronization signal and generates a scan pulse to scan a display panel, based on the internal synchronization signal. FIG. 4 is an example showing a state in which jitter occurs in the internal synchronization signal generated by the timing controller according to an embodiment of the present disclosure.

Referring to FIG. 3 and FIG. 4, the external system according to one embodiment of the present disclosure outputs a synchronization signal 310 to the controller 140. Then, the timing controller 160 in the controller 140 may generate the internal synchronization including the internal horizontal synchronization signal and the internal vertical synchronization signal based on the synchronization signal (Xsync in) 320 output from the external system and input thereto.

For example, the timing controller 160 may generate an internal horizontal synchronization signal 330 based on the synchronization signal 310 input from the external system as an external synchronization signal. Alternatively or additionally, the timing controller 160 may generate the internal vertical synchronization signal by the synchronization signal 310 input from the external system.

The synchronization signal (Xsync) 310 input from the external system includes a clock (or a clock cycle) of a certain period. For example, the synchronization signal (Xsync) 310 may be output from the external system, and the synchronization signal (Xsync) 310 output from the external system is input to the timing controller 160. The clock may hold a logic high level for its duty cycle or hold a logic low level for its duty cycle. In the description herein, a clock of a signal may be described to hold a high logic level (or a high level) for its duty cycle for illustrative purposes, which does not limit the scope of the disclosure. The same signal may include a clock that hold a logic low level for its duty cycle, which does not deviate from the concept of the disclosure and is included in the scope of the disclosure.

The synchronization signal (Xsync) 310 output from the external system may be delayed and then the delayed synchronization signal 320 may be input to the timing controller 160 as an input synchronization signal.

For example, the synchronization signal (Xsync) 310 output from the external system may be delayed and the delayed synchronization signal (Xsync in) 320 may be input to the timing controller 160 as the input synchronization signal.

For example, a first clock 311 of the synchronization signal (Xsync) 310 output from the external system may be delayed 301 and then be input to the timing controller 160. Likewise, a second clock 312 of the synchronization signal (Xsync) 310 output from the external system may be delayed 302 and then be input to the timing controller 160.

According to an embodiment of the present disclosure, the timing controller 160 may generate the internal horizontal synchronization signal (hsync) 330 based on the input synchronization signal (Xsync) 320.

For example, the timing controller 160 may generate the internal horizontal synchronization signal 330 whose voltage changes from a low level to a high level at a point (or a time point) at which a voltage of the input synchronization signal falls from a high level to a low level.

For example, the timing controller 160 may generate the internal horizontal synchronization signal 330 having a first clock 331. In this regard, a voltage of the first clock 331 of the internal horizontal synchronization signal 330 changes from a logic low level "low level" to a logic high level "high level" at a point (or a time point) at which a voltage of the first clock 321 of the input synchronization signal 320 changes (or falls) from a logic high level voltage "high voltage," to a logic low level voltage "low voltage," and then the voltage of the clock of the internal horizontal synchronization signal 330 is maintained at the high level for a certain period of time. In the description herein, an event occurs at a time point also include the scenario that the event occurs about and later than the time point.

Likewise, the timing controller 160 may generate the internal horizontal synchronization signal 330 having a second clock 332. In this regard, a voltage of the second clock 332 of the internal horizontal synchronization signal 330 changes from a low level to a high level at a point (or a time point) at which a voltage of the second clock 322 of the input synchronization signal 320 changes (or falls) from a high voltage to a low voltage, and then the voltage of the clock of the internal horizontal synchronization signal 330 is maintained at the high level for a certain period of time.

Likewise, the timing controller 160 may generate the internal horizontal synchronization signal 330 having an n-th clock. In this regard, a voltage of the n-th clock of the internal horizontal synchronization signal 330 changes from a low level to a high level at a point (or a time point) at which the n-th clock of the input synchronization signal 320 changes (or falls) from a high voltage to a low voltage, and then the voltage of the n-th clock of the internal horizontal synchronization signal 330 is maintained at the high level for a certain period of time.

According to an embodiment of the present disclosure, the timing controller 160 may generate scan pulse signals (or "scan pulses") 340 and 350 that scan the pixel of the display panel 110 based on the internal horizontal synchronization signal 330.

For example, the timing controller 160 may generate the scan pulse signal (or "scan pulse") 340 with a clock 341 of a certain period of time 303 after the voltage of the first clock 331 of the internal horizontal synchronization signal 330 changes from a high level to a low level. After the voltage of the first clock 331 of the internal horizontal synchronization signal 330 has changed from a high level to a low level, the clock 341 changes from a logic high voltage to a logic low voltage, and after the certain period 303, the voltage of the scan pulse 340 changes from a low voltage to a high voltage. Additionally, the timing controller 160 may output the generated scan pulse 340 to a first scan pulse line SPL1 of the display panel 110.

Likewise, the timing controller 160 may generate a scan pulse 350 with a clock 351 for a certain period 304 after the voltage of the second clock 332 of the internal horizontal synchronization signal 330 changes from a high level to a low level. Additionally, the timing controller 160 may output the generated scan pulse 350 to a second scan pulse line SPL2 of the display panel 110.

However, jitters 401, 402, 403, and 404 may be generated in the internal horizontal synchronization signal 330 generated by the timing controller 160 based on the external synchronization signal. In this case, timings of all signals as generated based on the internal horizontal synchronization signal may be deviated. For example, jitters 405 and 406 generated in the scan pulse signal 340 may affect the image of the display panel, thereby causing noise and other image defects of the display panel.

For example, in the scan pulse signal 340, the jitter 405 corresponding to the point (or the time point) at which a voltage of the first clock 331 of the internal horizontal synchronization signal 330 rises is greater than the jitter 406 corresponding to the point (or the time point) at which a voltage of the first clock 331 falls.

Figure 5:
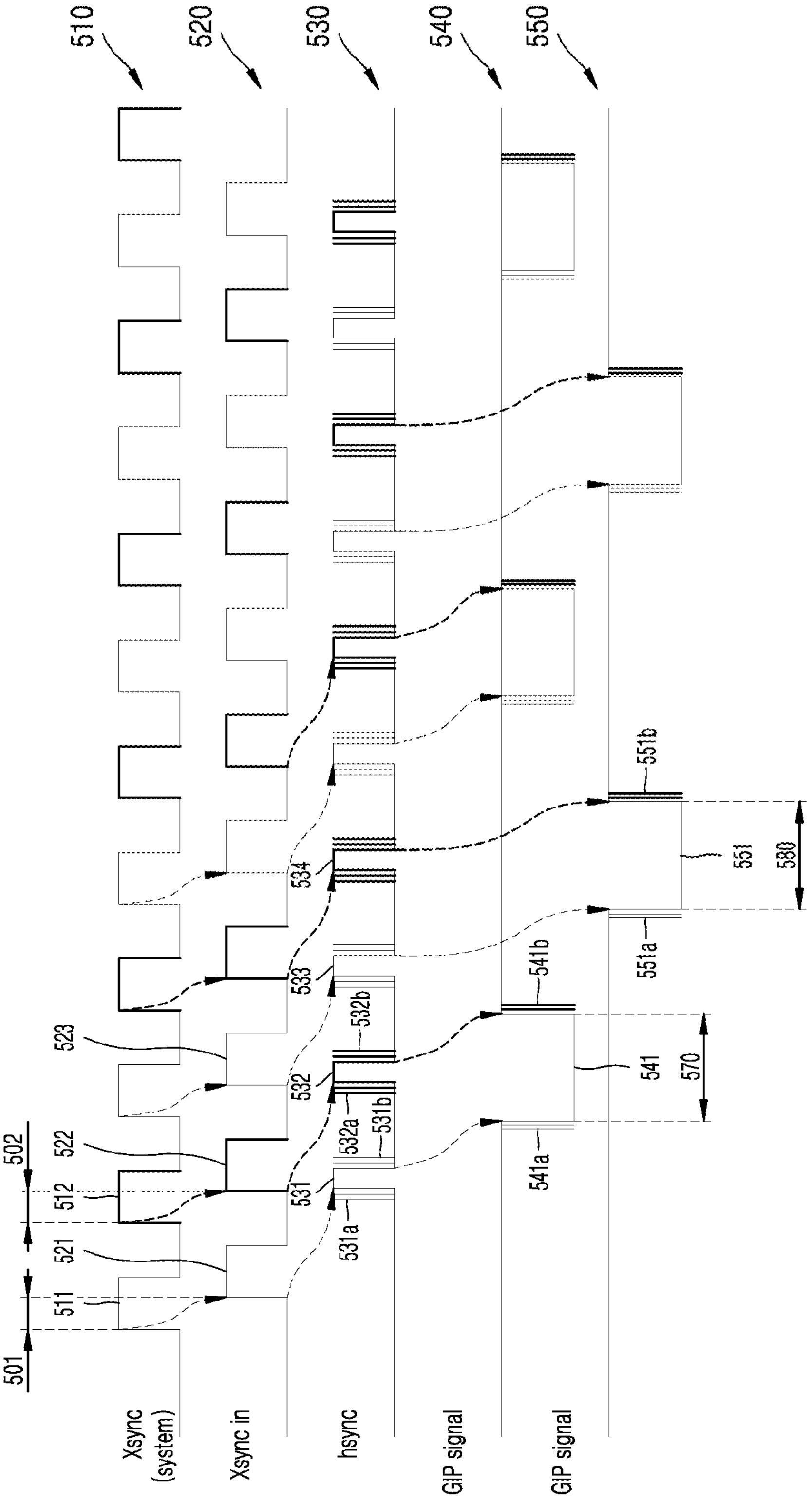
FIG. 5 is an example in which a timing controller generates an internal synchronization signal based on an external synchronization signal and generates a scan pulse to scan a display panel based on the internal synchronization signal according to another embodiment of the present disclosure.

FIG. 5 is an example in which a timing controller according to another embodiment of the present disclosure generates an internal synchronization signal based on an external synchronization signal and generates a scan pulse signal to scan a display panel based on the internal synchronization signal.

Referring to FIG. 5, the external system (external to the timing controller 160) according to another embodiment of the present disclosure outputs a synchronization signal 510. Then, the timing controller 160 may generate an internal synchronization signal including one or more of an internal horizontal synchronization signal and an internal vertical synchronization signal using a synchronization signal (Xsync in) 520 output from the external system and input to the timing controller 160.

For example, the timing controller 160 may generate an internal horizontal synchronization signal 530 based on the synchronization signal 510 input from the external system. Alternatively or additionally, the timing controller 160 may generate an internal vertical synchronization signal based on the synchronization signal 510 input from the external system.

The synchronization signal (Xsync) 510 input from the external system includes a clock of a certain period. For example, the synchronization signal (Xsync) 510 may be output from the external system. The synchronization signal (Xsync) 510 output from the external system is input to the timing controller 160.

The synchronization signal (Xsync) 510 output from the external system may be delayed and then the delayed synchronization signal 520 may be input to the timing controller 160 as the input synchronization signal.

For example, the synchronization signal (Xsync) 510 output from the external system may be delayed and input to the timing controller 160 as an input synchronization signal (Xsync in) 520.

According to an embodiment of present disclosure, the timing controller 160 may increase a frequency of the synchronization signal (Xsync) 510 (e.g., the external synchronization signal) by a predetermined multiple (e.g., 2 times). For example, increasing the frequency of the synchronization signal (Xsync) 510 by the predetermined multiple (e.g., 2 times) may mean that the number of clocks of the synchronization signal, e.g., in a certain duration of time, is increased by the predetermined multiple (e.g., 2 times).

According to an embodiment of present disclosure, a first clock 511 of the synchronization signal (Xsync) 510 output from the external system may be delayed 501 to become the clock 521 of the delayed input synchronization signal 520 and then be input to the timing controller 160. Likewise, a second clock 512 of the synchronization signal (Xsync) 510 output from the external system may be delayed 502 to become the clock 522 of the delayed input synchronization signal 520 and then be input to the timing controller 160.

According to an embodiment of present disclosure, the timing controller 160 may generate the internal horizontal synchronization signal (hsync) 530 based on the input synchronization signal (Xsync in) 520.

For example, the timing controller 160 may generate the internal horizontal synchronization signal 530 having a first clock 531. A voltage of the first clock 531 may change from a low level to a high level (e.g., a rising edge of the first clock 531) at or about a point (or a time point, e.g., a starting point of the rising edge) at which the voltage of a second clock 522 (i.e., a next clock to a first clock 521) of the input synchronization signal rises from a low level to a high level, e.g., a rising edge of the second clock 522. For example, a jitter 531*a* may be generated when the voltage of the first clock 531 changes from a low level to a high level. Furthermore, a jitter 531*b* may be generated when the voltage of the first clock 531 changes from a high level to a low level.

Likewise, the internal horizontal synchronization signal 530 has a second clock 532 whose voltage changes from a low level to a high level (rising edge) at a point (or a time point) at which a voltage of a third clock 523 (i.e., a next clock to the second clock 522) of the internal synchronization signal 520 rises from a low level to a high level. For example, a jitter 532*a* may be generated when a voltage of the second clock 532 changes from a low level to a high level. Furthermore, a jitter 532*b* may be generated when a voltage of the second clock 532 changes from a high level to a low level.

For example, the timing controller 160 generates the internal horizontal synchronization signal 530 such that the voltage of the first clock 531 of the internal horizontal synchronization signal 530 changes from a low level to a high level at a point (or a time point) at which the voltage of the second clock 522 (e.g., next to the first clock 521) of the input synchronization signal 520 rises from a low voltage to a high voltage and then the voltage of the first clock 531 may be maintained at the high level for a certain period of time.

Likewise, the timing controller 160 generates the internal horizontal synchronization signal 530 such that the voltage of the second clock 532 of the internal horizontal synchronization signal 530 changes from a low level to a high level at a point (or a time point) at which the voltage of the third clock 523 (e.g., next to the second clock 522) of the input synchronization signal 520 rises from a low voltage to a high voltage and then the voltage of the second clock 532 may be maintained at the high level for a certain period of time.

Likewise, the timing controller 160 generates the internal horizontal synchronization signal 530 such that a voltage of an n-th clock of the internal horizontal synchronization signal 530 changes from a low level to a high level at a point (or a time point_ at which a voltage of an (n+1)-th clock (e.g., next to an n-th clock) of the input synchronization signal 520 rises from a low voltage to a high voltage and then the voltage of the n-th clock of the internal horizontal synchronization signal 530 may be maintained at the high level for a certain period of time. That is, the n-th clock of the internal horizontal synchronization signal 530 corresponds to an (n+1)-th clock (e.g., next to an n-th clock) of the input synchronization signal 520 in that the starting points of the rising edges thereof corresponds to one another. And there are at least one clock 521 in the input synchronization signal 520 (precedent to other clocks of the input synchronization signal 520 that correspond to clocks in the internal horizontal synchronization signal 530) that does not correspond to any clocks in the internal horizontal synchronization signal 530. Note that the most first clock 531 in the internal horizontal synchronization signal 530 corresponds to the clock 522 in the input synchronization signal 520, which is subsequent to the clock 521 of the input synchronization signal 520 that does not correspond to any clocks in internal horizontal synchronization signal 530.

According to an embodiment of present disclosure, the timing controller 160 may generate scan pulse signals 540 and 550 configured to drive the pixels of the display panel 110 based on the internal horizontal synchronization signal 530.

For example, the timing controller 160 may generate the scan pulse 540 with a clock 541 of a certain period of time 570 after the voltage of the first clock 531 of the internal horizontal synchronization signal 530 changes from a high level to a low level. The timing controller 160 may be configured to generate the scan pulse 540 such that when a voltage of the first clock 531 of the internal horizontal synchronization signal 530 falls from a high voltage to a low voltage, the scan pulse 540 falls from a high voltage to a low voltage, and when the voltage of the second clock 532 of the internal horizontal synchronization signal 530 falls from a high voltage to a low voltage, the scan pulse 540 that has fallen to the low voltage rises to a high voltage. The generated scan pulse 540 may be generated based on a point at which a voltage of the first clock 531 of the internal horizontal synchronization signal 530 falls and a point at which a voltage of the second clock 532 of the internal horizontal synchronization signal 530 falls. After the voltage of the first clock 531 of the internal horizontal synchronization signal 530 changes from a high level to a low level (e.g., a falling edge), the voltage of the second clock 532 of the internal horizontal synchronization signal 530 changes from a high level to a low level, and then the voltage of the clock 541 changes from low voltage to high voltage (e.g., a rising edge). For example, after the certain period of time 570 after the voltage of the clock 541 changes from high voltage to low voltage, the voltage of the clock 541 changes from low voltage to high voltage. For example, a jitter 541*a* may be generated when the voltage of the clock 541 changes from a high level to a low level. Furthermore, a jitter 541*b* may be generated when the voltage of the clock 541 changes from a low level to a high level. And, the timing controller 160 may output the generated scan pulse signal 540 to the first scan pulse line SPL1 of the display panel 110. That is, the falling edge and the rising edges of the clock 541 in the scan pulse signal 540 correspond to falling edges of two different clocks 531 and 532, respectively, of the internal horizontal synchronization signal 530.

Likewise, the timing controller 160 may generate the scan pulse 550 with a clock 551 of a certain period of time 580 after a voltage of the third clock 533 of the internal horizontal synchronization signal 530 changes from a high level to a low level. After the voltage of the third clock 533 of the internal horizontal synchronization signal 530 changes from a high level to a low level, a voltage of the fourth clock 534 of the internal horizontal synchronization signal 530 changes from a high level to a low level, and then, a voltage of the clock 551 changes from low voltage to high voltage again. For example, after a certain period of time 580 after the voltage of the clock 551 changes from high voltage to low voltage, the voltage of the clock 551 changes from low voltage to high voltage again. For example, a jitter 551*a* may be generated when the voltage of the clock 551 changes from a high level to a low level. Furthermore, a jitter 551*b* may be generated when the voltage of the clock 551 changes from a low level to a high level. And, the timing controller 160 may output the generated scan pulse 550 to the second scan pulse line SPL2 of the display panel 110.

As described above, the controller 140 (e.g., the timing controller 160) according to an embodiment of the present disclosure may generate the internal synchronization signal including one or more of the internal horizontal synchronization signal and the internal vertical synchronization signal, based on the external synchronization signal having the frequency increased by the predetermined multiple as input thereto, and may generate the scan pulse signal that scans the display panel 110 based on one or more of the generated internal horizontal synchronization signal and the generated internal vertical synchronization signal. For example, the external synchronization signal may be received from the external system or from the timing controller 160.

According to an embodiment of present disclosure, when the synchronization signal with the frequency increased by the predetermined multiple (e.g., two times) is input from the external system to the controller 140 (e.g., timing controller 160), the controller 140 (e.g., timing controller 160) may generate the internal horizontal synchronization signal so that after a voltage of the first clock 521 of the input synchronization signal falls from a high voltage to a low voltage, a point (or a time point) at which the voltage of the second clock 522 of the input synchronization signal 520 rises from a low voltage to a high voltage and a point (or a time point) at which a voltage of the first clock 531 of the internal horizontal synchronization signal 530 rises from low voltage to high voltage coincide or correspond with each other. Furthermore, the controller 140 (e.g., timing controller 160) may generate the internal horizontal synchronization signal 530 so that after a voltage of the second clock 522 of the input synchronization signal 520 falls from a high voltage to a low voltage, a point (or a time point) at which the voltage of the third clock 523 of the input synchronization signal 520 rises from a low voltage to a high voltage and a point (or a time point) at which a voltage of the second clock 532 of the internal horizontal synchronization signal 530 rises from low voltage to high voltage coincide with each other.

Although jitters 531*a*, 531*b*, 532*a* and 532*b* may be generated in the internal horizontal synchronization signal 530 generated by the timing controller 160 based on the external synchronization signal, a delay between the point (or the time point) at which a voltage of the clock 541 of the scan pulse signal 540 changes from a low level to a high level and the point (or the time point) at which a voltage of the second clock 532 of the internal horizontal synchronization signal 530 changes from a high level to a low level in FIG. 5 is smaller than a delay between the point (or the time point) at which the voltage of the clock 341 changes from a low level to a high level and the point (or the time point) at which a voltage of the first clock 331 of the internal horizontal synchronization signal 330 changes from a high level to a low level in FIG. 4. Therefore, the jitter in FIG. 5 may be smaller than that in FIG. 4.

Figure 6:
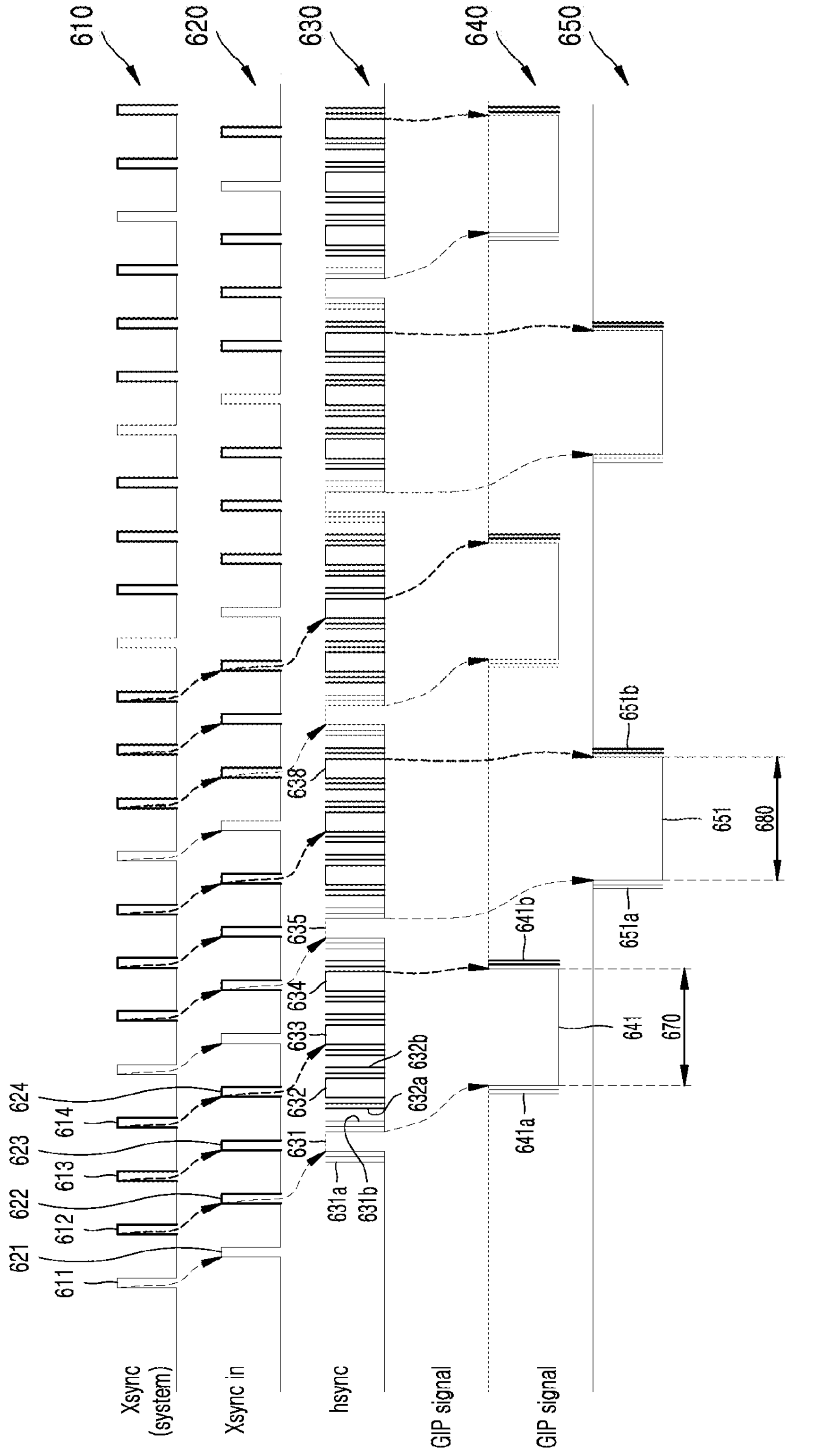
FIG. 6 is an example in which a timing controller generates an internal synchronization signal based on an external synchronization signal and generates a scan pulse to scan a display panel based on the internal synchronization signal according to another embodiment of the present disclosure.

FIG. 6 is an example in which a timing controller according to another embodiment of the present disclosure generates an internal synchronization signal based on an external synchronization signal and generates a scan pulse to scan a display panel based on the internal synchronization signal.

Referring to FIG. 6, an external system (or timing controller 160) according to another embodiment of the present disclosure outputs a synchronization signal 610. The synchronization signal 610 may be a signal having a frequency increased by a predetermined multiple. Further, the timing controller 160 may generate an internal synchronization signal including an internal horizontal synchronization signal and an internal vertical synchronization signal based on a synchronization signal (Xsync in) 620 output from the external system and then input thereto.

For example, the timing controller 160 may generate an internal horizontal synchronization signal 630 based on the synchronization signal 610 input from the external system. Alternatively or additionally, the timing controller 160 may generate an internal vertical synchronization signal using the synchronization signal 510 input from the external system.

The synchronization signal (Xsync) 610 input from the external system includes a clock of a certain period. For example, the synchronization signal (Xsync) 610 may be a signal having a frequency increased by four times and may include clocks 611, 612, 613, and 614.

According to an embodiment of present disclosure, the timing controller 160 may increase the frequency of the synchronization signal (Xsync) 610 (e.g., external synchronization signal) by a predetermined multiple (e.g., 4 times). For example, increasing the frequency of the synchronization signal (Xsync) 610 by the predetermined multiple (e.g., 4 times) means that the number of clocks of the synchronization signal increases by the predetermined multiple (e.g., 4 times).

According to an embodiment of present disclosure, the timing controller 160 may generate the internal horizontal synchronization signal (hsync) 630 based on the input synchronization signal (Xsync in) 620, which have clocks 621, 622, 623, 624 that delays from the corresponding clocks 611, 612, 613, and 614 in the synchronization signal 610.

For example, the timing controller 160 may generate the internal horizontal synchronization signal 630 having a first clock 631. A voltage of the first clock 631 changes from a low level to a high level (e.g., a rising edge) at a point (or a time point, e.g., a starting point of the rising edge) at which the voltage of a third clock 623 (i.e., a next clock to a second clock 622) of the input synchronization signal rises from a low level to a high level. For example, a jitter 631*a* may be generated when the voltage of the first clock 631 changes from a low level to a high level. Furthermore, a jitter 631*b* may be generated when the voltage of the first clock 631 changes from a high level to a low level.

Likewise, the internal horizontal synchronization signal 630 has a second clock 632, a voltage of which changes from a low level to a high level at a point (or a time point) at which a voltage of a fourth clock 624 (i.e., a next clock to the third clock 623) of the internal synchronization signal 620 rises from a low level to a high level. For example, a jitter 632*a* may be generated when a voltage of the second clock 632 changes from a low level to a high level. Furthermore, a jitter 632*b* may be generated when a voltage of the second clock 632 changes from a high level to a low level.

For example, the timing controller 160 generates the internal horizontal synchronization signal 630 such that the voltage of the first clock 631 of the internal horizontal synchronization signal 630 changes from a low level to a high level at a point (or a time point) at which the voltage of the third clock 623 (e.g., next to the second clock 622) of the input synchronization signal 620 rises from a low voltage to a high voltage and then the voltage of the first clock 631 may be maintained at the high level for a certain period of time.

Likewise, the timing controller 160 generates the internal horizontal synchronization signal 630 such that the voltage of the second clock 632 of the internal horizontal synchronization signal 630 changes from a low level to a high level at a point (or a time point) at which the voltage of the fourth clock 624 (e.g., next to the third clock 623) of the input synchronization signal 620 rises from a low voltage to a high voltage and then the voltage of the second clock 632 is maintained at the high level for a certain period of time.

Likewise, the timing controller 160 generates the internal horizontal synchronization signal 630 such that a voltage of an n-th clock of the internal horizontal synchronization signal 630 changes from a low level to a high level at a point (or a time point) at which a voltage of an (n+2)-th clock (e.g., next to an (n+1)-th clock) of the input synchronization signal 620 rises from a low voltage to a high voltage and then the voltage of the n-th clock of the internal horizontal synchronization signal 630 may be maintained at the high level for a certain period of time. That is, the n-th clock of the internal horizontal synchronization signal 630 corresponds to an (n+2)-th clock (e.g., next to an (n+1)-th clock) of the input synchronization signal 620 in that the starting points of the rising edges thereof corresponds to one another. And there are at least two clocks 621, 622 in the input synchronization signal 620 (precedent to other clocks of the input synchronization signal 620 that correspond to clocks in the internal horizontal synchronization signal 630) that do not correspond to any clocks in the internal horizontal synchronization signal 630. Note that the most first clock 631 in the internal horizontal synchronization signal 630 corresponds to the clock 623 in the input synchronization signal 620, which is subsequent to the clock 621 and the clock 622 of the input synchronization signal 620 that do not correspond to any clocks in internal horizontal synchronization signal 630.

According to an embodiment of present disclosure, the timing controller 160 may generate scan pulses 640 and 650 configured to drive the pixels of the display panel 110 based on the internal horizontal synchronization signal 630.

For example, the timing controller 160 may generate the scan pulse signal 640 with a clock 641 of a certain period of time 670 after the voltage of the first clock 631 of the internal horizontal synchronization signal 630 changes from a high level to a low level (e.g., a falling edge). The timing controller 160 may be configured to generate the scan pulse 640 such that when the voltage of the first clock 631 of the internal horizontal synchronization signal 630 falls from a high voltage to a low voltage, the scan pulse 640 falls from a high voltage to a low voltage, and when the voltage of the fourth clock 634 of the internal horizontal synchronization signal 630 falls from a high voltage to a low voltage, the scan pulse 640 that has fallen to the low voltage rises to a high voltage. The generated scan pulse 640 may be generated based on a point at which the voltage of the first clock 631 of the internal horizontal synchronization signal 630 falls and a point at which the voltage of the fourth clock 634 of the internal horizontal synchronization signal 630 falls. After the voltage of the first clock 631 of the internal horizontal synchronization signal 630 changes from a high level to a low level (e.g., a falling edge), the voltage of the fourth clock 634 of the internal horizontal synchronization signal 630 changes from a high level to a low level (e.g., falling edge). At this time, the voltage of the clock 641 changes from low voltage to high voltage (e.g., a rising edge). For example, after the certain period of time 670 after the voltage of the clock 641 changes from high voltage to low voltage (e.g., a falling edge), the voltage of the clock 641 changes from low voltage to high voltage (e.g., a rising edge). For example, a jitter 641*a* may be generated when the voltage of the clock 641 changes from a high level to a low level. Furthermore, a jitter 641*b* may be generated when the voltage of the clock 641 changes from a low level to a high level. Further, the timing controller 160 may output the generated scan pulse 640 to the first scan pulse line SPL1 of the display panel 110. That is, the falling edge and the rising edges of the clock 641 in the scan pulse signal 640 correspond to falling edges of two different clocks 631 and 634, respectively, of the internal horizontal synchronization signal 630.

Likewise, the timing controller 160 may generate the scan pulse 650 with a clock 651 of a certain period of time 680 after a voltage of a fifth clock 635 of the internal horizontal synchronization signal 630 changes from a high level to a low level. After the voltage of the fifth clock 635 of the internal horizontal synchronization signal 630 changes from a high level to a low level, a voltage of an eighth clock 638 of the internal horizontal synchronization signal 630 changes from a high level to a low level. At this time, a voltage of the clock 651 changes from low voltage to high voltage again. For example, after a certain period of time 680 after the voltage of the clock 651 changes from high voltage to low voltage, the voltage of the clock 651 changes from low voltage to high voltage again. For example, a jitter 651*a* may be generated when the voltage of the clock 651 changes from a high level to a low level. Furthermore, a jitter 651*b* may be generated when the voltage of the clock 651 changes from a low level to a high level. Further, the timing controller 160 may output the generated scan pulse 650 to the second scan pulse line SPL2 of the display panel 110.

As described above, the controller 140 (e.g., the timing controller 160) according to an embodiment of the present disclosure may generate the internal synchronization signal including one or more of the internal horizontal synchronization signal or the internal vertical synchronization signal, based on the external synchronization signal having the frequency increased by the predetermined multiple as input thereto, and may generate the scan pulse signal that scans the display panel 110 based on the generated internal horizontal synchronization signal or the generated internal vertical synchronization signal. For example, the external synchronization signal may be received from the external system or from the timing controller 160.

According to an embodiment of present disclosure, when the synchronization signal with the frequency increased by the predetermined multiple (e.g., four times) is input from the external system to the controller 140 (e.g., timing controller 160), the controller 140 (e.g., timing controller 160) may generate the internal horizontal synchronization signal so that after a voltage of the second clock 622 of the input synchronization signal 620 falls from a high voltage to a low voltage, a point (or a time point) at which the voltage of the third clock 623 of the input synchronization signal rises from a low voltage to a high voltage and a point (or a time point) at which a voltage of the first clock 631 of the internal horizontal synchronization signal 630 rises from low voltage to high voltage coincide or correspond with each other.

Although jitters 631*a*, 631*b*, 632*a* and 632*b* may be generated in the internal horizontal synchronization signal 630 generated by the timing controller 160 based on the external synchronization signal, a delay between the point (or the time point) at which a voltage of the clock 641 of the scan pulse signal 640 changes from a low level to a high level and the point (or the time point at) which a voltage of the fourth clock 634 of the internal horizontal synchronization signal 630 changes from a high level to a low level in FIG. 6 may be smaller than a delay between the point (or the time point) at which the voltage of the clock 541 changes from a low level to a high level and the point (or the time point) at which a voltage of the second clock 532 of the internal horizontal synchronization signal 530 changes from a high level to a low level in FIG. 5. Therefore, the jitter in FIG. 6 may be smaller than that in FIG. 5.

A display apparatus according to embodiments of the present disclosure are briefly described below.

A display apparatus according to an embodiment of the present disclosure may comprise a display panel including a plurality of pixels, and a controller configured to control an operation of the display panel. The controller may be configured to generate an internal synchronization signal including one or more of an internal horizontal synchronization signal and an internal vertical synchronization signal, based on an external synchronization signal input thereto, the external synchronization signal having a frequency that increases by a multiple, and generate a scan pulse signal to scan the display panel, based on one or more of the generated internal horizontal synchronization signal and the generated internal vertical synchronization signal.

According to embodiments of the present disclosure, the controller may comprise a timing controller configured to generate the internal synchronization signal based on the external synchronization signal and to generate the scan pulse signal configured to drive the display panel based on the generated internal synchronization signal and a data driver configured to convert an image data transmitted from the timing controller into a data voltage and to supply the data voltage to the display panel.

According to embodiments of the present disclosure, the timing controller may be further configured to generate an input synchronization signal having a frequency increased by the multiple based on the external synchronization signal having the frequency increased by the multiple.

According to embodiments of the present disclosure, the timing controller may be further configured to generate the internal horizontal synchronization signal whose voltage changes from a low level to a high level at a point when a voltage of the input synchronization signal rises from a low level to a high level.

According to embodiments of the present disclosure, the multiple may be 2. The timing controller may be further configured to generate the internal horizontal synchronization signal so that after a voltage of a first clock of the input synchronization signal falls from a first high voltage to a first low voltage, a first point at which a voltage of a second clock of the input synchronization signal rises from a low voltage to a high voltage and a second point at which a voltage of the first clock of the internal horizontal synchronization signal rises from a low level to a high level coincide or correspond with each other.

According to embodiments of the present disclosure, the timing controller may be further configured to generate the internal horizontal synchronization signal so that after the voltage of the second clock of the input synchronization signal falls from the high voltage to the low voltage, a third point at which a voltage of a third clock of the input synchronization signal rises from the low voltage to the high voltage and a fourth point at which a voltage of a second clock of the internal horizontal synchronization signal rises from the low level to high level coincide or correspond with each other.

According to embodiments of the present disclosure, the scan pulse signal may be transmitted to a first scan pulse line. The timing controller may be further configured to generate the scan pulse signal such that when the voltage of the first clock of the internal horizontal synchronization signal falls from the high level to the low level, the scan pulse signal falls from a high voltage level to a low voltage level, and when the voltage of the second clock of the internal horizontal synchronization signal falls from the high level to the low level, the scan pulse signal rises from the low voltage level to the high voltage level.

According to embodiments of the present disclosure, the scan pulse signal may be generated based on a point at which the voltage of the first clock of the internal horizontal synchronization signal falls and a point at which the voltage of the second clock of the internal horizontal synchronization signal falls.

According to embodiments of the present disclosure, the multiple may be 4. The timing controller may be further configured to generate the internal horizontal synchronization signal so that after a voltage of a second clock of the input synchronization signal falls from a high voltage to a low voltage, a first point at which a voltage of a third clock of the input synchronization signal rises from the low voltage to the high voltage and a second point at which a voltage of a first clock of the internal horizontal synchronization signal rises from a low level to a high level coincide or correspond with each other.

According to embodiments of the present disclosure, the timing controller may be further configured to generate the internal horizontal synchronization signal so that after the voltage of the third clock of the input synchronization signal falls from the high voltage to the low voltage, a third point at which a voltage of a fourth clock of the input synchronization signal rises from the low voltage to the high voltage and a fourth point at which a voltage of a second clock of the internal horizontal synchronization signal rises from the low level to the high level coincide or correspond with each other.

According to embodiments of the present disclosure, the scan pulse signal may be transmitted to a first scan pulse line. The timing controller may be further configured to generate the scan pulse signal such that when the voltage of the first clock of the internal horizontal synchronization signal falls from the high level to the low level, the scan pulse signal falls from a high voltage level to a low voltage level, and when the voltage of the fourth clock of the internal horizontal synchronization signal falls from the high level to the low level, the scan pulse signal rises from the low voltage level to the high voltage level.

According to embodiments of the present disclosure, the scan pulse signal may be generated based on a point at which the voltage of the first clock of the internal horizontal synchronization signal falls and a point at which the voltage of the fourth clock of the internal horizontal synchronization signal falls.

According to embodiments of the present disclosure, the external synchronization signal may be input from an external system to the controller.

According to embodiments of the present disclosure, the input synchronization signal may be obtained by delaying the external synchronization signal.

According to embodiments of the present disclosure, the timing controller may be further configured to generate the scan pulse signal with a clock of a period of time after a voltage of a third clock of the internal horizontal synchronization signal changes from a high level to a low level, and the scan pulse signal with the clock of the period of time is transmitted to a second scan pulse line.

According to embodiments of the present disclosure, the timing controller may be further configured such that a voltage of the clock of the period of time changes from a low voltage to a high voltage after a voltage of a fourth clock of the internal horizontal synchronization signal changes from a high level to a low level.

According to embodiments of the present disclosure, the timing controller may be further configured to generate the scan pulse signal with a clock of a period of time after a voltage of a fifth clock of the internal horizontal synchronization signal changes from a high level to a low level, and the scan pulse signal with the clock of the certain period of time is transmitted to a second scan pulse line.

According to embodiments of the present disclosure, the timing controller may be further configured such that a voltage of the clock of the period of time changes from a low voltage to a high voltage at the time that a voltage of an eighth clock of the internal horizontal synchronization signal changes from a high level to a low level.

According to embodiments of the present disclosure, the timing controller and the data driver may be integrated with each other.

A display apparatus according to an embodiment of the present disclosure may include a display panel including a plurality of pixels, and a controller configured to control an operation of the display panel. The controller may be configured to generate an internal synchronization signal based on an input synchronization signal, the input synchronization signal including a plurality of first clocks, the internal synchronization signal including a plurality of second clocks, each second clock corresponding to a first clock in that a starting time point of a first edge of the second clock corresponds to a starting point of a first edge of the corresponding first clock, and at least one first clock not corresponding to any second clock and precedent to any first clock that corresponds to a second clock.

According to embodiments of the present disclosure, the first edge of the first clock and the first edge of the second clock may be both rising edges.

According to embodiments of the present disclosure, the input synchronization signal may be generated based on an external synchronization signal, and may include a delay with respect to the external synchronization signal.

According to embodiments of the present disclosure, the controller may be configured to generate a scan pulse signal based on the internal synchronization signal.

According to embodiments of the present disclosure, the scan pulse signal may include a plurality of third clocks, a first edge of a third clock corresponding to a second edge of a second clock of the internal synchronization signal, a second edge of the third clock corresponding to a second edge of another second clock of the internal synchronization signal.

According to embodiments of the present disclosure, the first edge of the third clock may be a falling edge and the second edge of the third clock may be a rising edge, and the second edges of the second clocks may be falling edges.

According to embodiments of the present disclosure, the at least one first clock not corresponding to any second clock may include two first clocks that do not correspond to any second clock.

It will be apparent to those skilled in the art that various modifications and variations may be made in the present disclosure without departing from the scope of the disclosures. Thus, it is intended that the present disclosure covers the modifications and variations of this disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:

a display panel including a plurality of pixels; and a controller configured to control an operation of the display panel, wherein the controller is configured to:

generate an internal horizontal synchronization signal including a plurality of clocks based on an external synchronization signal input thereto, the external synchronization signal having a frequency that increases by a multiple; and generate a scan pulse signal to scan the display panel based on the generated internal horizontal synchronization signal, wherein the internal horizontal synchronization signal includes a first clock and a second clock arranged sequentially, and wherein a temporal interval between a falling edge and a rising edge of the scan pulse signal is equal to a temporal interval between a falling edge of the first clock and a falling edge of the second clock.

2. The display apparatus of claim 1, wherein the controller comprises:

a timing controller configured to generate the internal horizontal synchronization signal based on the external synchronization signal and to generate the scan pulse signal configured to drive the display panel based on the generated internal horizontal synchronization signal; and a data driver configured to convert an image data transmitted from the timing controller into a data voltage and to supply the data voltage to the display panel.

3. The display apparatus of claim 2, wherein the timing controller is further configured to generate the internal horizontal synchronization signal having a frequency increased by the multiple based on the external synchronization signal having the frequency increased by the multiple.

4. The display apparatus of claim 3, wherein the multiple is 2, wherein the timing controller is further configured to generate the internal horizontal synchronization signal so that after a voltage of the first clock of the internal horizontal synchronization signal falls from a first high voltage to a first low voltage, a first point at which a voltage of the second clock of the internal horizontal synchronization signal rises from a low voltage to a high voltage and a second point at which a voltage of the first clock of the internal horizontal synchronization signal rises from a low level to a high level correspond with each other.

5. The display apparatus of claim 4, wherein the timing controller is further configured to generate the internal horizontal synchronization signal so that after the voltage of the second clock of the internal horizontal synchronization signal falls from the high voltage to the low voltage, a third point at which a voltage of a third clock following the second clock of the internal horizontal synchronization signal rises from the low voltage to the high voltage and a fourth point at which a voltage of a second clock of the internal horizontal synchronization signal rises from the low level to the high level correspond with each other.

6. The display apparatus of claim 5, wherein the scan pulse signal is transmitted to a first scan pulse line, and wherein the timing controller is further configured to generate the scan pulse signal such that when the voltage of the first clock of the internal horizontal synchronization signal falls from the high level to the low level, the scan pulse signal falls from a high voltage level to a low voltage level, and when the voltage of the second clock of the internal horizontal synchronization signal falls from the high level to the low level, the scan pulse signal rises from the low voltage level to the high voltage level.

7. The display apparatus of claim 6, wherein the timing controller is further configured to generate the scan pulse signal with a clock of a period of time after a voltage of the third clock of the internal horizontal synchronization signal changes from a high level to a low level, and the scan pulse signal with the clock of the period of time is transmitted to a second scan pulse line.

8. The display apparatus of claim 7, wherein the timing controller is further configured such that a voltage of the clock of the period of time changes from a low voltage to a high voltage after a voltage of a fourth clock of the internal horizontal synchronization signal changes from a high level to a low level.

9. The display apparatus of claim 6, wherein the scan pulse signal is generated based on a point at which the voltage of the first clock of the internal horizontal synchronization signal falls and a point at which the voltage of the second clock of the internal horizontal synchronization signal falls.

10. The display apparatus of claim 3, wherein the multiple is 4, wherein the timing controller is further configured to generate the internal horizontal synchronization signal so that after a voltage of the second clock of the internal horizontal synchronization signal falls from a high voltage to a low voltage, a first point at which a voltage of the third clock of the internal horizontal synchronization signal rises from the low voltage to the high voltage and a second point at which a voltage of the first clock of the internal horizontal synchronization signal rises from a low level to a high level correspond with each other.

11. The display apparatus of claim 10, wherein the timing controller is further configured to generate the internal horizontal synchronization signal so that after the voltage of the third clock of the internal horizontal synchronization signal falls from the high voltage to the low voltage, a third point at which a voltage of a fourth clock of the internal horizontal synchronization signal rises from the low voltage to the high voltage and a fourth point at which a voltage of the second clock of the internal horizontal synchronization signal rises from the low level to the high level correspond with each other.

12. The display apparatus of claim 11, wherein the scan pulse signal is transmitted to a first scan pulse line, wherein the timing controller is further configured to generate the scan pulse signal such that when the voltage of the first clock of the internal horizontal synchronization signal falls from the high level to the low level, the scan pulse signal falls from a high voltage level to a low voltage level, and when the voltage of the fourth clock of the internal horizontal synchronization signal falls from the high level to the low level, the scan pulse signal rises from the low voltage level to the high voltage level.

13. The display apparatus of claim 12, wherein the timing controller is further configured to generate the scan pulse signal with a clock of a period of time after a voltage of a fifth clock of the internal horizontal synchronization signal changes from a high level to a low level, and the scan pulse signal with the clock of the certain period of time is transmitted to a second scan pulse line.

14. The display apparatus of claim 13, wherein the timing controller is further configured such that a voltage of the clock of the period of time changes from a low voltage to a high voltage at the time that a voltage of an eighth clock of the internal horizontal synchronization signal changes from a high level to a low level.

15. The display apparatus of claim 12, wherein the scan pulse signal is generated based on a point at which the voltage of the first clock of the internal horizontal synchronization signal falls and a point at which the voltage of the fourth clock of the internal horizontal synchronization signal falls.

16. The display apparatus of claim 3, wherein the timing controller is further configured to generate the internal horizontal synchronization signal whose voltage changes from a low level to a high level at a point when a voltage of the input synchronization signal rises from a low level to a high level.

17. The display apparatus of claim 16, wherein the internal horizontal synchronization signal is obtained by delaying the external synchronization signal.

18. The display apparatus of claim 2, wherein the timing controller and the data driver are integrated with each other.

19. The display apparatus of claim 1, wherein the external synchronization signal is input from an external system to the controller.

* * * * *